Patented Apr. 14, 1925.

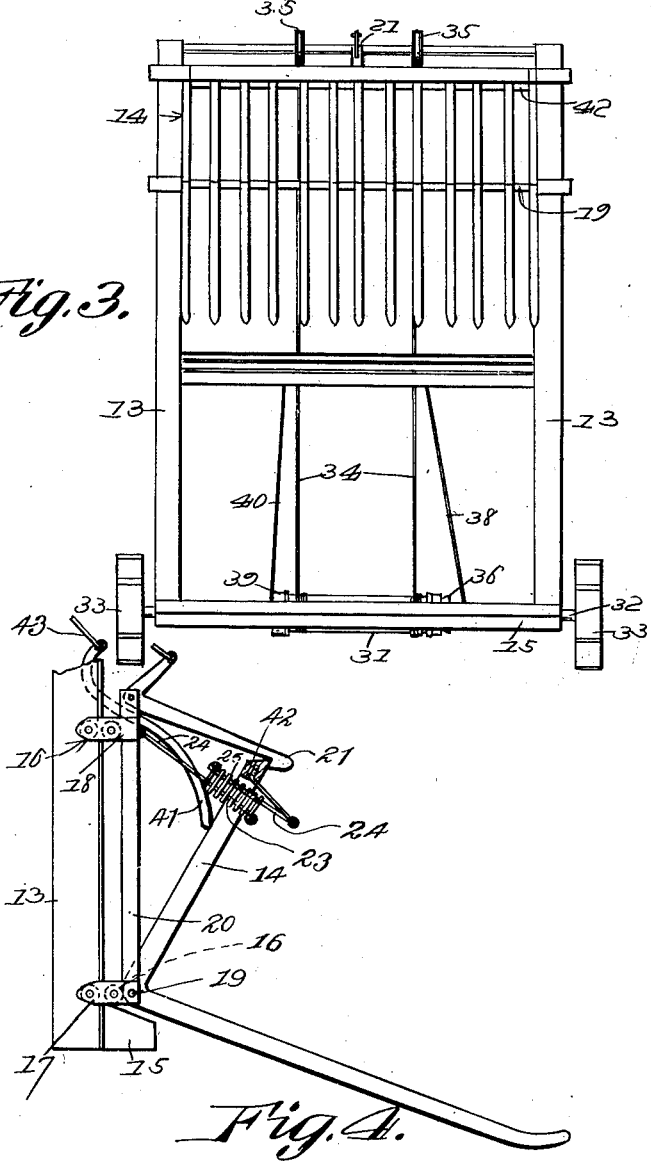

1,533,894

UNITED STATES PATENT OFFICE.

HENRY A. PETERSON, OF HOLDREGE, NEBRASKA.

HAYSTACKER.

Application filed July 13, 1921. Serial No. 484,361.

*To all whom it may concern:*

Be it known that HENRY A. PETERSON, a citizen of the United States of America, residing at Holdrege, in the county of Phelps and State of Nebraska, has invented new and useful Improvements in Hay Stackers, of which the following is a specification.

The object of the invention is to provide a simple and efficient hay stacker of the vertical type for use in connection with a tractor or similar vehicle for gathering hay or cut grain and depositing it in a wagon or in windrows or stacks for subsequent gathering, the parts of the device being so arranged as to provide for the control thereof with facility by the operator of the tractor occupying the usual seat or station; and with these objects in view the invention consists in a construction and combination of parts of which a preferred embodiment is shown in the accompanying drawings, wherein:—

Figure 3 is a front view.

Figure 4 is a detail view showing the fork head in its depressed position and tilted for ensuring a close or clean gathering of the hay or grain.

Figure 5 is an enlarged detail sectional view of the fork cushioning means.

Figure 1:
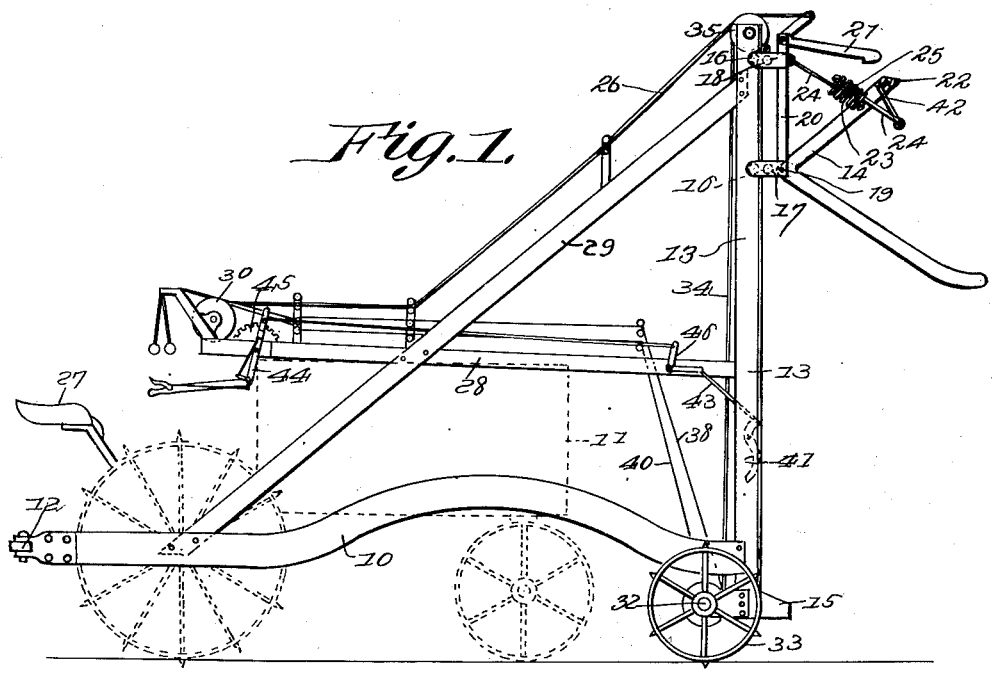
Figure 1 is a side view of a stacker embodying the invention.
Figure 2:
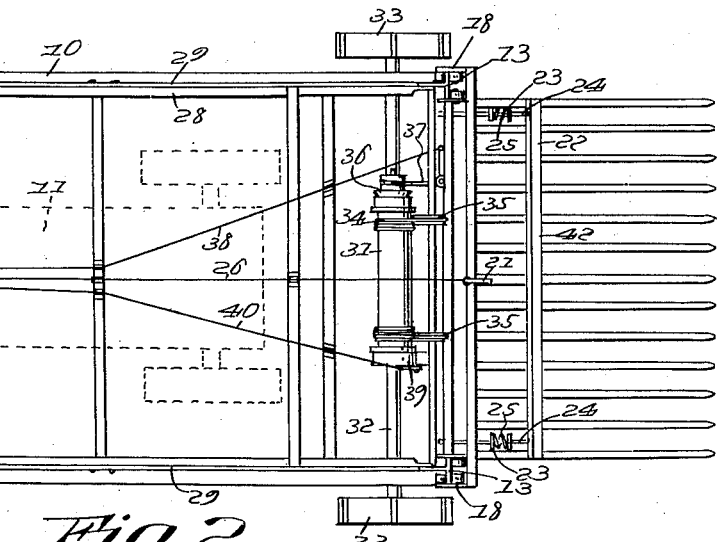
Figure 2 is a plan view of the same.

The apparatus consists essentially of a push frame consisting of side beams 10 spaced apart laterally to a distance sufficient to permit of straddling a tractor, so that the latter as shown at 11 in dotted lines may be arranged between the side beams and may be connected with the rear ends of the frame as by a push bar 12 or any convenient portion of the tractor frame; together with an upright frame supported by the push frame and consisting of the side standards 13 for supporting and guiding the vertical movement of the fork head 14 under the control of suitable mechanism hereinafter described.

In practice the side beams of the push frame may be made of structural I-beams connected at their front ends by a cross beam 15, and the standards of the upright frame may consist of T-beams of which the flanges form tracks for traverse by the inner and outer guide rollers 16 of the carriers 17 and 18 to the former of which the fork is pivoted for tilting movement as shown at 19 while the latter, connected with the former by a suitable brace 20 is provided with a latch 21 for engaging the back 22 of the fork to lock the latter in its horizontal or elevating position. The tilting movement of the fork under the weight of a load of hay or grain thereon in discharging the latter is limited by a cushioning means 23, consisting in the construction illustrated of rods 24 connected with opposite ends of a cushioning spring 25 which while permitting a cushioned and limited downward swinging movement of the fork tends to raise the same when relieved of a load so as to be locked in the horizontal position by means of the latch 21 which may be disengaged from the fork to permit of the tilting or discharging movement thereof by means of an operating cord 26 extending to and within convenient reach of an operator occupying the seat 27 of the tractor and supported by an overhead frame 28 extending rearwardly from the upright front frame. Braces 29 may be employed as indicated to connect the rear ends of the side beams of the push frame with the standards of the upright frame to stiffen the structure, and the overhead frame 28 may be secured thereto at an intermediate point as shown. Preferably the trip operating cord is attached to a spring actuated take-up drum 30 mounted upon the overhead frame 28 and having a spring tension sufficient to remove slack from the said operating cord without tending to operate the latch, so that in the vertical movements of the fork incident to the lowering thereof for operation and the elevation thereof for raising a load of gathered hay or grain, the operating cord will yield without releasing the fork. The disengagement of the latch, however, can be effected at any elevation of the fork by an operation thereof by the attendant.

The operation of the fork vertically is effected by means of a drum 31 loosely mounted on the axle 32 of the front supporting wheels 33 of the push frame, said drum being connected with the upper carrier of the fork by means of cables 34 extending over suitable guide pulleys 35 at the top of the upright frame, and said drum may be connected with the shaft to cause the forward movement of the push frame to raise the fork by means of a clutch 36 actuable by means of a shifting lever 37 controlled by a cord 38 carried over suitable guides on the overhead frame 28 within convenient reach of the operator. Also a brake 39 is arranged in connection with a drum 31 for checking the movement thereof, said brake being carried by the front beam 15 and being actuable by a cord 40 also carried through suitable guides on the overhead frame to within reach of the operator.

Obviously the clutch may be operated to cause the elevation of the fork to the desired extent to deposit the load which has been gathered thereby upon the suitable vehicle, and when a sufficient elevation has been reached the clutch may be disconnected and the brake engaged to hold the fork at the required elevation while the latch 21 is tripped to release the fork to permit of the discharging movement thereof under the weight of the load.

In its lowered position the fork is supported by the engagement of the lower carrier 17 with the beam 15 which constitutes a rest or seat, and to tilt the fork so that the front ends of the teeth thereof operate close to the surface of the ground to effect a clean gathering of the hay or grain, a tilting arm 41 is arranged on the upright frame within reach of the cross bar 42 at the upper edge of the back of the fork, and is actuable by an operating cord 43 also extending longitudinally of the overhead frame to an operating lever 44 having a dog for engagement with a ratchet 45. A bell-crank lever 46 may be interposed in said operating connection for the tilting arm to permit of locking the same in the desired position.

Having described the invention, what is claimed as new and useful is:—

1. A hay stacker having a push frame provided with laterally spaced side beams to permit of the arrangement therebetween of a tractor, a push bar spanning the rear ends of said side beams and adapted for attachment at an intermediate point to a convenient portion of the tractor frame, an upright frame supported by the front end of the push frame, a fork mounted for vertical movement upon the upright frame, a ground wheel supporting the push frame at the forward end, fork actuating means operatively connected with the ground wheel, an overhead frame paralleling the push frame and terminating adjacent the tractor seat, and controlling means for the fork actuating means carried by said overhead frame.

2. A hay stacker having a push frame with which may be connected a tractor, an upright frame supported by the front end of the push frame, a fork mounted for vertical movement upon the upright frame, and means for elevating the fork when loaded, a carrier mounted upon the upright frame and having the fork pivotally mounted thereon, cushioning means for yieldingly holding the fork in its normal position and permitting pivotal movement thereof to a load discharging position, and latch mechanism for locking the fork in its operative position.

3. A hay stacker having a push frame with which may be connected a tractor, an upright frame supported by the front end of the push frame, a fork mounted for vertical movement upon the upright frame, and means for elevating the fork when loaded, a carrier being mounted upon the upright frame and having the fork pivotally mounted thereon, yielding means for yieldingly holding the fork in its normal position for permitting tilting movement thereof under the weight of a load to load discharging position, a latch for locking the fork in its normal position, and means for tilting the fork when in its lowered or load gathering position, to depress the load engaging extremities of the fork teeth.

In testimony whereof he affixes his signature.

HENRY A. PETERSON.